United States Patent [19]

De Coene

[11] 4,453,373
[45] Jun. 12, 1984

[54] CROP GATHERING ATTACHMENT FOR CROP HARVESTING MACHINE

[75] Inventor: Frans J. G. C. De Coene, Zedelgem, Belgium

[73] Assignee: Sperry Corporation, New Holland, Pa.

[21] Appl. No.: 357,020

[22] Filed: Mar. 11, 1982

[30] Foreign Application Priority Data

Mar. 16, 1981 [GB] United Kingdom ............... 8108119

[51] Int. Cl.³ .......................................... A01D 41/06
[52] U.S. Cl. ..................................... 56/14.6; 56/14.5;
56/364; 171/133
[58] Field of Search ............... 56/364, 344, 14.3–14.6,
56/192, 16.5; 171/133, 113

[56] References Cited

U.S. PATENT DOCUMENTS

| 925,691 | 6/1909 | Freer | 171/133 |
| 1,714,889 | 5/1929 | Raoult | 171/133 |
| 3,613,336 | 10/1971 | Smith | 56/192 |

FOREIGN PATENT DOCUMENTS

| 2365029 | 10/1974 | Fed. Rep. of Germany | 56/14.5 |
| 1048299 | 8/1953 | France | 171/133 |
| 204787 | 1/1968 | U.S.S.R. | 56/14.5 |
| 304903 | 7/1971 | U.S.S.R. | 171/113 |
| 272707 | 11/1974 | U.S.S.R. | 171/133 |

Primary Examiner—Jay N. Eskovitz
Attorney, Agent, or Firm—Larry W. Miller; Darrell F. Marquette; Frank A. Seemar

[57] ABSTRACT

A crop gathering attachment for a crop harvesting machine is disclosed wherein a feeder mechanism is disposed between the cutterbar and the consolidating auger. The feeder mechanism includes a plurality of transversely mounted rotary members having crop conveying members in the form of helical flanges radially affixed thereto and rotatable therewith. The rotary members are mounted such that the crop conveying members on each of the rotary members interleave with the crop conveying members of the adjacent rotary members. The rotary members are rotated in the same direction so that the crop conveying members constitute in effect a moving floor operable to transfer crop from the cutterbar generally longitudinally of the attachment to the consolidating auger for feeding to the crop harvesting machine for further harvesting treatment.

32 Claims, 5 Drawing Figures

CROP GATHERING ATTACHMENT FOR CROP HARVESTING MACHINE

BACKGROUND OF THE INVENTION

This invention relates to crop gathering attachments for crop harvesting machines.

It is usual in crop harvesting machines for standing crop to be harvested by first cutting it and then feeding the cut crop to crop processing components such as a threshing and separating mechanism in the case of a combine harvester, or a chopper in the case of a forage harvester, for example. The feeding of the cut crop to the crop processing components needs to be fluent and consistent so as to load those components uniformly and hence maximize the capacity of the machine. In some known machines the means, such as an auger, for feeding the cut crop to the crop processing means are located at a relatively short distance behind the cutter means which is desirable from the standpoint of positively moving the crop to the processing means immediately after it has been cut but which gives rise to the problem, in some instances, of crop being acted upon by the feeder means before it is cut and thus being pulled. This tends to happen with crop having long stalks (such as rye and rape for example) which is not standing upright due to adverse weather conditions.

Another problem experienced with known machines arises when the crop is wet and/or infested with weeds. With crop in either of these conditions there is a problem of achieving a fluent flow and there is a tendency for crop to accumulate in the dead spot which inevitably exists between the cutter means and feeder means even if a reel is used to help sweep the crop first to the cutter means and thence to the feeder means.

There exists a device which is employed between the cutter means and the feeder means and which in effect constitutes additional feeder means. The device in question is the so-called draper and a crop gathering attachment embodying the same is disclosed in U.S. Pat. No. 4,038,809. Since the draper separates the cutter and the normal feeder means and is itself not as aggressive as the latter, then the aforementioned problem of pulling long-stalked crops before they are cut is avoided. Also, the problem associated with the dead spot in which wet or weed-infested crop tends to accumulate is relieved.

However, the draper is in effect a continuous belt conveyor, usually made of convas, and it is difficult to provide adequate tracking means without using complicated, and hence expensive, components for the belt. Also, crop material tends to wrap around the ends of the shafts carrying the canvas belt and eventually gets between the belt and the shafts. This, together with inadequate tracking, results in belt replacement. For this reason, the draper has not become a universally accepted device.

SUMMARY OF THE INVENTION

The main object of this invention is to overcome the aforementioned disadvantages of the prior art by providing a crop gathering mechanism utilizing the advantages of the conventional draper, yet avoiding its disadvantages.

It is a further object of this invention to provide a crop gathering attachment for a crop harvesting machine which comprises crop receiving means operable, in use, to receive crop from the ground, first crop feeder means, and second crop feeder means disposed between the crop receiving means and the first feeder means, the second feeder means comprising a plurality of rotary members each in the form of shaft means on which are mounted a plurality of crop conveying means extending from the shaft means and relatively closely spaced axially thereof, the shaft means extending transversely of the attachment and being spaced relative to each other so that the crop conveying means of adjacent rotary members interleave, and the rotary members in use being rotated in the same direction so that they constitute in effect a moving floor operable to transfer crop from the crop receiving means generally longitudinally of the attachment to the first feeder means.

It is another object of this invention to provide in a crop harvesting machine crop conveying means in the form of two or more fingers spaced equiangularly around the associated shaft means and having an outer extremity which trails relative to the direction of rotation of the rotary member. Alternatively, the crop conveying means may each be in the form of a flange having a shaped periphery such as circular, triangular or other polygonal shape, although it is preferred to employ a square periphery. Each flange, whatever its shape, may be formed separately and mounted on the shaft means or may be linked with each other. In the latter case, the crop conveying means of each rotary member may be in the form of a helix with a small pitch such that the helix does not act as an auger and convey crop transversely of the attachment. The crop conveying means may be composed of a synthetic plastics material and those provided on a given shaft means may be cut from a block of such material or molded.

It is still another object of this invention to provide grain collecting and grain conveying mechanisms in association with the rotary members of the crop gathering attachment to collect and convey grain falling between the rotary members when the crop moves over the floor of the crop gathering attachment.

It is an advantage of this invention that the crop can be conveyed by the rotary members either over or under the floor.

It is a feature of this invention that the grain conveying mechanism can be disposed either centrally or to one or both sides of the attachment.

The grain collecting means may be in the form of an auger and may constitute one of said rotary members, with the other rotary members having crop-conveying means preferably in the form of a helix. The auger is arranged to cooperate with a grain collecting trough, in which all grain falling between the rotary members is collected, and to feed the same to the grain conveyor means for conveying to the crop processing components of the machine to which the attachment is fitted. However, as far as the cut crop is concerned, the auger acts merely to convey it to the next rotary member generally longitudinally of the attachment. Small pieces of straw, for example, may also fall between the rotary members and are conveyed with the grain as described.

It is yet another object of this invention to provide a smooth flow of crop from the crop receiving mechanism to the second feeder device by limiting the vertical distance between the crop receiving mechanism and the outer extremities of the crop conveying means of the rotary member immediately adjacent the crop receiving mechanism. Accordingly, the effective diameter of said immediately adjacent rotary member may be made as small as possible with the effective diameters of the succeeding rotary members being made increasingly larger, if desired.

It is a still further object of this invention to provide crop receiving means in the form of a crop cutting mechanism if the machine is designed to harvest standing crop. Alternatively, the crop receiving means may be in the form of a pick-up device if the machine is designed to harvest previously cut and windrowed crop. In this case, the pick-up device may be of conventional form having tines, for example.

These and other objects, features and advantages are accomplished according to the instant invention by providing a crop gathering attachment for a crop harvesting machine wherein a feeder mechanism is disposed between the cutterbar and the consolidating auger. The feeder mechanism includes a plurality of transversely mounted rotary members having crop conveying members in the form of helical flanges radially affixed thereto and rotatable therewith. The rotary members are mounted such that the crop conveying members on each of the rotary members interleave with the crop conveying members of the adjacent rotary members. The rotary members are rotated in the same direction so that the crop conveying members constitute in effect a moving floor operable to transfer crop from the cutterbar generally longitudinally of the attachment to the consolidating auger for feeding to the crop harvesting machine for further harvesting treatment.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
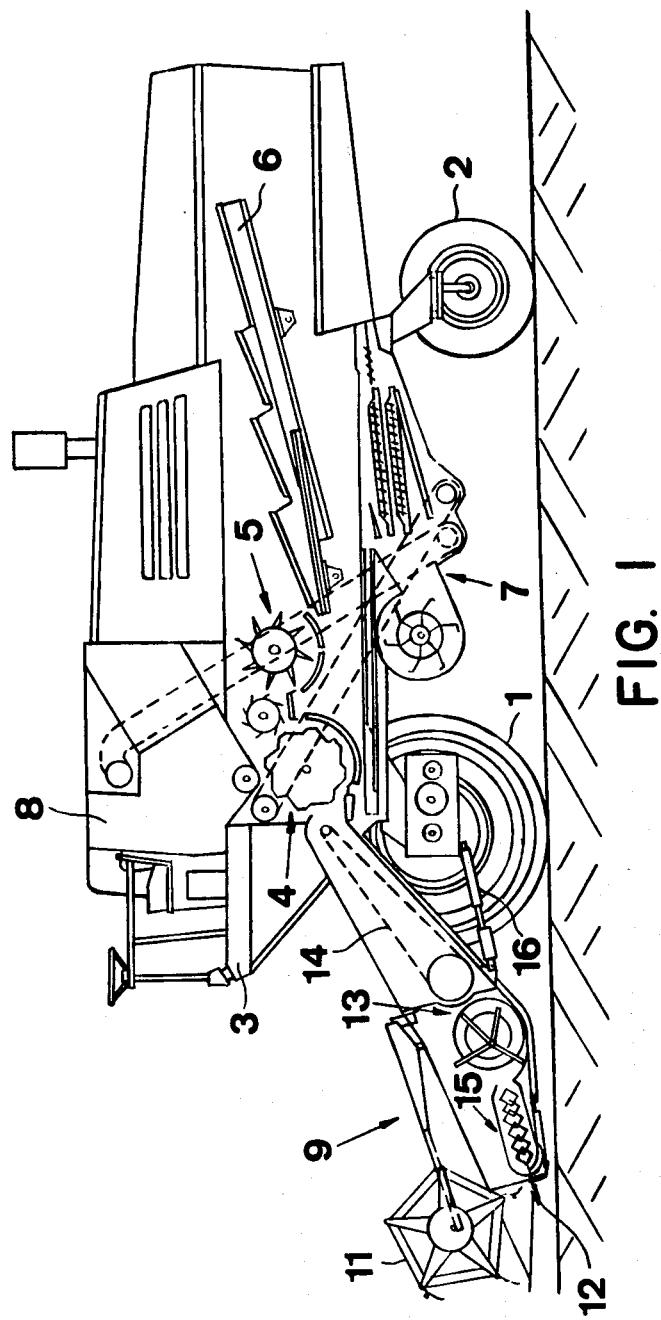
FIG. 1 is a side view of a combine harvester (with certain parts removed) fitted with a first embodiment of the crop gathering attachment incorporating the principles of the instant invention.

Referring now to FIG. 1, a side elevational view of a combine harvester incorporating the principles of the instant invention can be seen. The combine harvester is generally of conventional form in that the main body is fitted with a pair of front wheels 1, a pair of rear, steerable wheels 2 and has an operator's platform 3. The main body further comprises threshing and separating means 4, separating means 5, straw walkers 6, cleaning means 7 and a grain tank 8. As is also conventional, the main body of the combine harvester is fitted with a header 9 but in this instance, the header constitutes a crop gathering attachment in accordance with the present invention.

Still referring to FIG. 1, the heater 9 comprises a reel 11, crop receiving means in the form of a reciprocatory cutterbar 12, an auger 13 and an elevator 14 extending between the auger 13 and the threshing and separating means 4, all of which are conventional components. The auger 13 forms first crop feeder means and second crop feeder means generally indicated at 15 are provided between the cutterbar 12 and the auger 13. The header 9 is pivotally attached to the main body of the combine harvester and is adjustable relative thereto, in the normal manner, by hydraulic actuators 16 disposed one on each side of the machine.

The auger 13 has two oppositely wound flights 17 (FIG. 3) disposed one at each end of a tubular body portion 18 supported for rotation on a tubular shaft 19. Mounted eccentrically with respect to the shaft 19 is a further and stationary shaft 21 from which extend tines or fingers 22 which are equiangularly disposed with respect to the body portion 18. The tines 22 extend through slots in the body portion 18 and slide relative thereto on rotation of the body portion 18 as is conventional.

Figure 2:
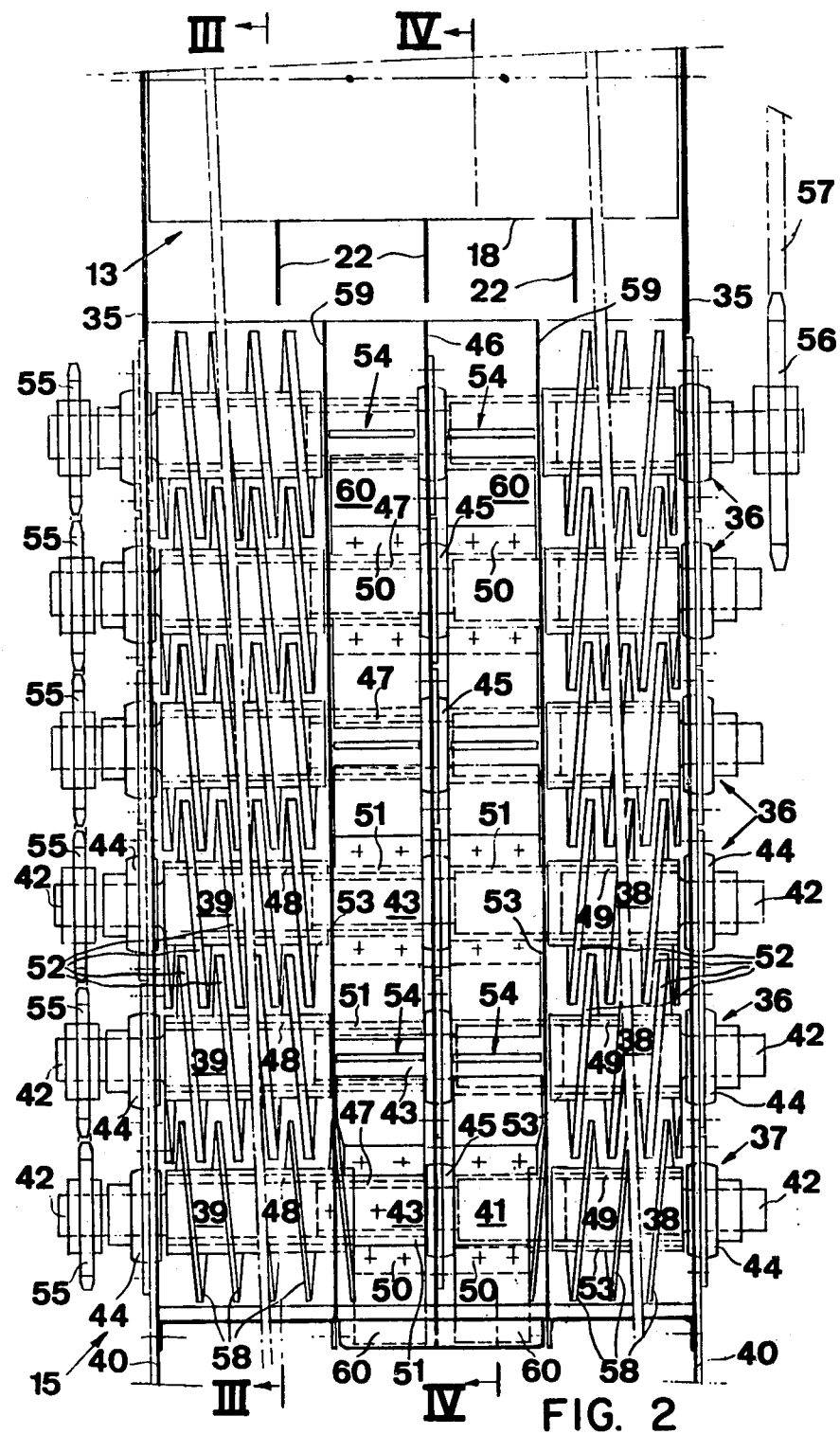
FIG. 2 is an enlarged plan view of part of the crop gathering attachment seen in FIG. 1.
Figure 3:
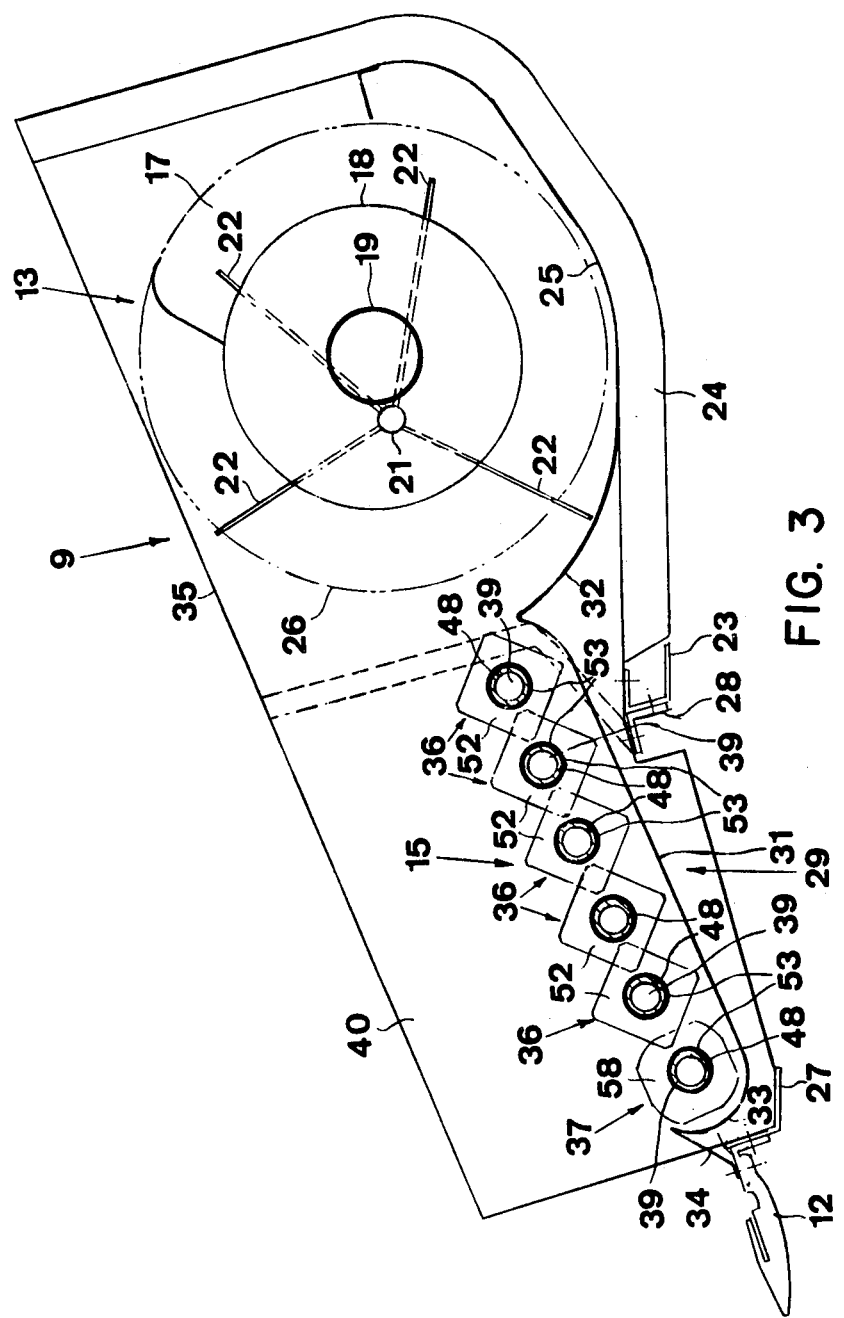
FIG. 3 is a cross-sectional view taken along lines III–III of FIG. 2, yet on a different scale.
Figure 4:
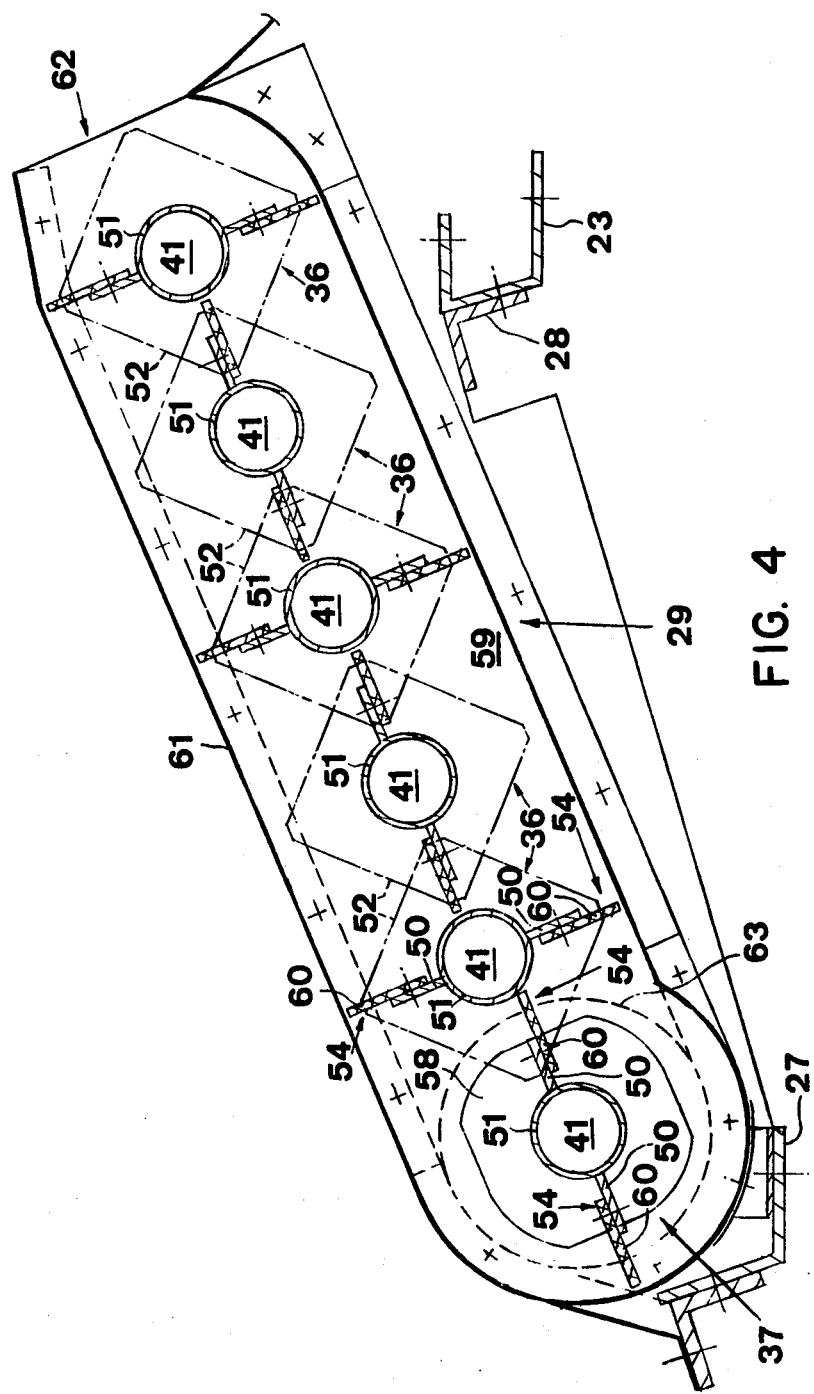
FIG. 4 is a cross-sectional view taken along lines IV—IV of FIG. 2.

Referring now more particularly to FIGS. 2 to 4, the header 9 is formed in two parts, the rear part comprising a transverse mounting beam 23 and two longitudinal beams 24 extending rearwardly of the combine harvester from the beam 23. The beams 23 and 24 support a floor portion 25 shaped as are the beams 24, to conform generally, and be closely spaced with respect to, the path 26 circumscribed by the outer extremities of the flights 17 of the auger 13. The second and front part of the header, which is the essence of the present invention, comprises a front transverse beam 27 and a rear transverse beam 28, the latter being detachably connected to the beam 23. The cutterbar 12 is connected to the transverse beam 27 which also supports one end of a floor 29 having a substantially planar portion 31 extending upwardly and rearwardly towards the auger 13, and a portion 32 which extends downwardly to meet the auger floor 25 and which conforms to the path circumscribed by a component of the second feeder means 15 to be described and then extends downwardly and forwardly therefrom to form a ramp 34 which assists the movement of crop material from the cutterbar 12 to the second feeder means.

Two sidewalls 35 extend in the fore-and-aft direction of the header 9 and are attached to the beam 23. Two further sidewalls 40 extend the length of the second feeder means 15 only and are attached to the respective beams 27, 28 and are also secured to the respective sidewalls 35.

The second feeder means 15 comprise a plurality of rotary members which number six in the illustrated embodiment and extend transversely of the header, between the sidewalls 40, one behind the other. Five of the rotary members 36 are identical, with the forwardmost one 37 being of slightly different construction. The axes of all six rotary members lie substantially in a common plane.

Each of the rotary members 36 comprises a composite shaft made up, as seen in FIG. 2, of right-hand and left-hand stub shafts 38 and 39, respectively, and a central stub shaft 41. The stub shafts 38 and 39 each have a portion 42 of reduced diameter and the central stub shaft 41 has a portion 43 of reduced diameter, the portions 42 receiving bearings 44 mounted in the respective sidewalls 40, and the portion 43 receiving a bearing 45 mounted in a central wall 46 extending the length of the second feeder means 15. A metal sleeve 47 is secured over the reduced diameter portion 43 of the central stub shaft 41 to increase its effective diameter to that of the main body of the adjacent stub shaft 39, whereby a metal sleeve 48 can be secured over both the stub shaft 39 and the sleeve 47 to make the stub shafts 39 and 41 unitary. A similar metal sleeve 49 is secured over the stub shaft 38 and the main body of the stub shaft 41 so as to make these two shafts unitary and hence unitary with the stub shaft 39 to provide the composite shaft. Each sleeve 48 stops short of the central bearing 45 but is effectively extended to that bearing by sleeve 51 of a synthetic plastics material.

The two stub shafts 38 and 39 each have a crop conveying means mounted thereon in the form of a helix 52 attached to a sleeve 53 which is secured over the metal sleeve 47 or 49 as appropriate. The helix 52 and sleeve 53 may be constructed separately or as an integral unit and are composed of a synthetic plastics material which enables the unit to be molded if desired. As seen in FIGS. 3 and 4, the turns of each helix 52 have a square periphery with the corners taken off and, as seen in FIG. 2, the helix on shaft 38 is of opposite hand to that on shaft 39.

The central sleeves 51 carry two pairs of diametrically opposed paddles 54 formed by rigid members 50 and flexible members 60, with the paddles of one rotary member 36 being arranged at right angles to the paddles of the or each adjacent rotary member. This relative orientation of the paddles 54 is maintained, while keeping the respective helices 52 similarly oriented (as seen in FIGS. 3 and 4), by rotating the shafts of the rotary members in timed relationship. This is achieved by sprockets 55 attached to the reduced diameter portions 42 of the left-hand stub shafts 39 which are driven through chain transmissions (not shown). The reduced diameter portion 42 of the right-hand rearmost stub shaft 38 is provided with a sprocket 56 which is driven by a chain 57 in turn driven from a drive mechanism (not shown) on the header of the combine harvester. Thus, the sprocket 56 is driven and drives the rearmost rotary member 36 which in turn drives in timed relationship, the remaining rotary member through the sprockets 55.

The forwardmost rotary member 37 is very similar in construction to the rotary members 36 in that it has the same form of composite shaft and supporting bearings. The only difference is that the helix 58 on each stub shaft 38 and 39 has slightly differently shaped turns which are also of a smaller thickness than the helices 52 of the rotary members 36. Again as seen in FIGS. 3 and 4, the helices 58 each have a generally square periphery although the corners thereof are more rounded in order that it can be mounted as close as possible to the forward end 33 of the floor 29 and hence as close as possible to the cutterbar 12. The central stub shaft 41 of the forwardmost rotary member 37 is also provided with paddles 54 and rotary member is driven in timed relationship with the rest by a sprocket 55.

The paddles 54 of all the rotary members 36 and 37 are enclosed by a casing extending longitudinally of the header 9 and comprising two sidewalls 59, a top cover 61 and the associated portion of the floor 29, the only opening being a rear discharge opening 62 and two inlet openings 63 provided at the lower front ends of each sidewall 59. The casing defined above also comprises the central wall 46. The forwardmost rotary member 37 serves two functions, firstly to feed crop from the cutterbar 12 to the adjacent rotary member 36 and secondly, to act as an auger as will be explained in greater detail in due course.

The illustrated attachment has a width of approximately 3 meters and the helices 52 and 58 have turns approximately 90 mm square, 4 mm thick and spaced apart by 20 mm, giving a pitch of 24 mm, and a pitch angle of 6°. Thus the spacing between a turn of one helix 52 and an adjacent turn of an interleaving helix 52 is approximately 8 mm, this spacing being slightly greater with respect to the forwardmost rotary member 37 and the adjacent rotary member 36 due to the smaller thickness of the turns of the helix 58. This very close spacing of the interleaving turns of the helices 52 and 58 gives rise to a substantially continuous floor over which the cut crop passes to the auger 13. It is desirable for the circumferential speed of the helices 52 and 58 to be slightly greater than the average forward speed of the machine to which the attachment is fitted so that the rotary members 36 and 37 have a positive effect on the cut crop and in the case of a combine harvester, this is achieved by rotating the rotary members at 220–280 r.p.m.

In use of the attachment illustrated in the drawings, the front part is first mounted on the transverse beam 23 and it should be noted here that this design enables alternative devices to be used with the auger 13 and, for example, the cutterbar 12 may be mounted directly on the transverse beam 23. The whole header constituted by the attachment constructed in accordance with the invention is then mounted on the main body of the combine harvester which is now ready for use and the driven components are set in motion whereby, inter alia, the reel 11 is rotated, the cutterbar 12 is reciprocated, and the rotary members 36 and 37 and the auger 13 are rotated. Thus as the combine harvester moves forward into standing crop, the latter is swept by the reel 11 towards the cutterbar 12 and cut by the latter. The cut crop moves up the ramp 34, due to the combined action of the reel 11 and the forward movement of the machine, and is then acted upon by the forwardmost rotary member 37 which serves to pass the cut crop to the adjacent rotary member 36 and so on until the cut crop reaches the auger 13. Thus the rotary members 36 and 37 forming the second feeder means 15 feed the crop generally longitudinally of the machine and it should be noted that the helices 52 and 58 do not act as augers so as to feed the cut crop transversely of the machine. Once the cut crop reaches the auger 13, it is consolidated centrally of the machine and fed to subsequent components for treatment in the conventional manner. It will be noted that the plane containing the axes of the shafts 38, 39 and 41 is inclined upwardly from the cutterbar 12 such that the second feeder means 15 feeds cut crop to the auger 13 at about the level of the rotary axis thereof.

It is found that the rotary members 36 and 37 provide a very satisfactory feed device for the cut crop which acts positively on the crop so as to achieve fluent and even flow thereof. There is little or no tendency for cut crop to fall between the turns of the interleaving helices 52 and 58 because they are closely spaced so that the crop easily bridges adjacent turns. Also, the interleaving arrangement of the turns effects a self-cleaning action should some stalks tend to find their way into the spaces between adjacent turns.

Since the second feeder means 15 separates the first feed means, in the form of the auger 13, from the cutterbar 12, there is little or no possibility for the auger to act upon crop material before it is cut. This, coupled with the ability of the second feeder means 15 to feed cut crop positively to the auger 13, means that all the advantages of a craper are obtained without the disadvantages. Using the illustrated attachment constructed in accordance with the invention of a 15% increase in the capacity of the combine harvester has been achieved. The additional weight of the second feeder means 15 is minimized by using lightweight synthetic plastics material for parts of the rotary members 36 and 37.

As the cut crop moves over the floor provided by the second feeder means 15, there is a tendency for some grain and small straw pieces to be separated therefrom and this falls through the spaces between the turns of the helices 52 and 58 to the floor 29, the major portion 31 of which slopes downwardly and forwardly of the machine. Thus the grain and small straw pieces are collected by gravitation (although to some extent assisted by the angled edges of the helices 52) in the trough formed by the portion 33 of the floor 29 with which the forwardmost rotary member 37 cooperates so as to fulfill its second function as an auger. The two helices 58 convey the collected grain and other material to the center of the heater 9 where it is fed through the respective openings 63 whereupon it is engaged by the paddles 54 of the rotary member 37 and thrown over the top of the latter to the paddles 54 of the adjacent rotary member 36. The paddles 54 of this rotary member take over and throw the grain and other material to the next rotary member 36 and so on until this grain and other material reaches the auger 13 from which it is taken with the cut crop to the subsequent components of the combine harvester. It will be seen from FIG. 4 that the length of each paddle 54, as seen radially with respect to the sleeves 51 carrying the same, is substantially equal to the spacing between adjacent sleeves 51 so that there is little likelihood of grain falling to the floor 29 once it has been picked up by the paddles 54 of the forwardmost rotary member 37 but if any grain does so fall, it will move down the floor 29 to be acted upon again by the paddles of the rotary member 37.

Thus the increased capacity of the machine due to the presence of the second feeder means 15 is not detracted from by extra grain loss because any grain separated in that feeder means is collected and transferred with cut crop to the normal grain handling components of the combine harvester.

Figure 5:
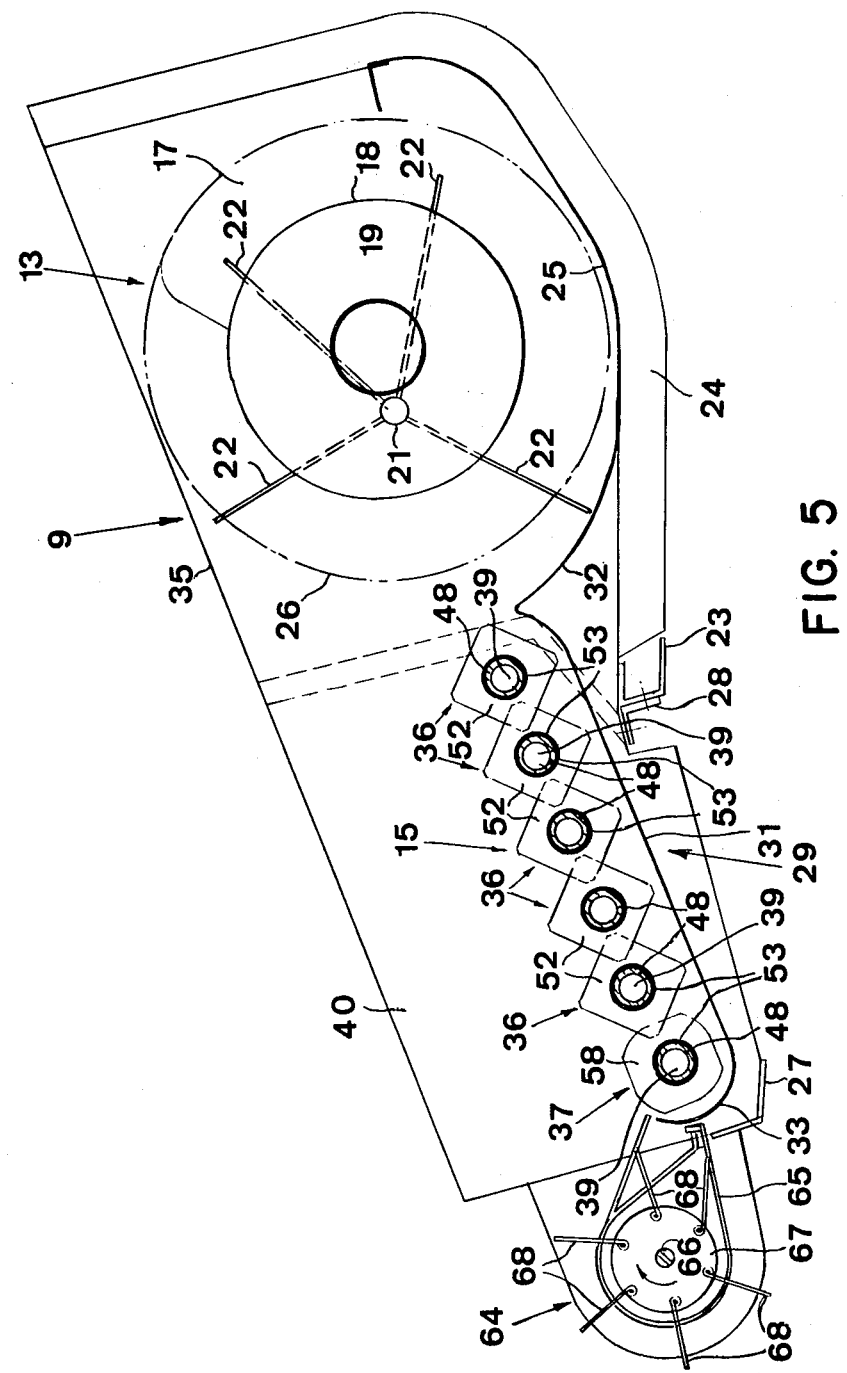
FIG. 5 is a cross-sectional view of an alternative embodiment, corresponding to the view seen in FIG. 3.

The crop gathering attachment of FIGS. 1 to 4 can be modified so as to be capable of harvesting previously cut and windrowed crop and FIG. 5 illustrates such an embodiment. It will be seen that FIG. 5 is identical to FIG. 3 (with like components carrying the same reference numerals) except that the cutterbar 12 has been replaced by a crop pick-up device indicated generally at 64. The pick-up device 64 is conventional and comprises a frame 65 by which it is mounted on the transverse beam 27 and a shaft 66 carrying a plurality of discs 67 from which extend a plurality of retractable tines 68. Each tine 68 is pivotally mounted on the associated disc 67 so as to extend generally radially thereof when in the crop pick-up position and then to take up a retracted (trailing) position in the region when the crop being carried is to be released as it passes to the second feeder means 15. Of the six tines 67 shown in FIG. 5, the ones in the seven, nine and eleven o'clock positions are in the crop pick-up position, and the remainder are in the crop-release position.

The attachment of FIG. 5 can also be used in conjunction with a combine harvester, as with the embodiment of FIGS. 1 to 3, and is useful in harvesting those crops such as rape which are often cut and windrowed rather than harvested from the standing condition. However, the reel 11 shown in FIG. 1 is removed since it is not required with the attachment of FIG. 5. Both of the illustrated attachments can be used with machines other than combine harvesters. Also, one basic attachment can be used for harvesting both standing and windrowed crop by making the cutterbar 12 and pick-up device 64 detachable so that one or the other can be used as required.

Although in the two illustrated embodiments the turns of the respective helices 52 are similarly orientated, the turns of one can be arranged to be out of phase (by 45°, for example) with respect to the or each adjacent flight. Also, the periphery of each turn of the helices 52 and 58 may be of any shape and need not be square. Furthermore, the effective diameter of the rotary member 37 may be smaller than that of the rotary member 36 and the latter may have progressively increasing diameters from the rotary member 37.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A crop gathering attachment for a crop harvesting machine comprising crop receiving means operable, in use, to receive crop from the ground, first crop feeder means, and second crop feeder means disposed between the crop receiving means and the first feeder means, the second feeder means including a plurality of longitudinally spaced rotary members each in the form of shaft means on which are mounted a plurality of crop conveying means extending from the shaft means and relatively closely spaced axially thereof, the shaft means extending transversely of the attachment and being spaced relative to each other so that the crop conveying means of adjacent rotary members interleave, and the rotary members in use being rotated in the same direction so that they constitute in effect a moving floor operable to transfer crop from the crop receiving means generally longitudinally of the attachment to the first feeder means; the rotary member disposed immediately adjacent the crop receiving means being operable as an auger in cooperation with a trough formed in a floor member extending beneath the rotary members, said floor member being inclined downwardly towards the trough whereby grain and other material separated from crop material as it is acted upon, in use, by the second feeder means falls to the floor member and gravitates to the trough.

2. An attachment according to claim 1, wherein each crop conveying means is in the form of two or more fingers spaced equiangularly around the associated shaft means and having an outer extremity which trails relative to the direction of rotation of the rotary member.

3. An attachment according to claim 1, wherein each crop conveying means is in the form of a flange extending from the associated shaft means.

4. An attachment according to claim 3, wherein each crop conveying element comprises a turn of a helix mounted on the associated shaft means.

5. An attachment according to claim 4, wherein the pitch of each helix is of the order of 24 mm and the pitch angle is of the order of 6°.

6. An attachment according to claim 3, wherein the periphery of each flange or each turn of the helix is square.

7. An attachment according to claim 6, wherein the corners of each flange or turn of the helix are rounded.

8. An attachment according to claim 1, wherein each rotary member carries, in addition to the crop conveying means, grain conveying means and wherein, in use, said auger is operable to convey grain collected in the trough to the grain conveying means on the auger, these grain conveying means then passing the grain to the grain conveying means of the next adjacent rotary member and so on, whereby the grain is conveyed to the first feeder means.

9. An attachment according to claim 8, wherein the grain conveying means on each rotary member comprise paddles.

10. An attachment according to claim 9, wherein each paddle comprises a rigid portion attached to the associated shaft means and a flexible portion attached to the rigid portion.

11. An attachment according to claim 10, wherein each paddle extends generally radially of the shaft means by a distance substantially equal to the spacing between adjacent shaft means.

12. An attachment according to claim 11, wherein each rotary member is provided with at least one pair of diametrically opposed paddles.

13. An attachment according to claim 12, wherein the paddles of one rotary member are generally at right angles to the paddles of the or each adjacent rotary member, this relative orientation being maintained by driving the rotary members in timed relationship.

14. An attachment according to claim 13, wherein the grain conveying means are located centrally of the rotary members whereby the auger on the rotary member immediately adjacent the crop receiving means has two oppositely wound flights, one on either side of the grain conveying means so as, in use, to feed grain towards the center of the attachment, the remaining rotary members being provided with similarly wound helices.

15. An attachment according to claim 14, wherein grain conveying means are provided at one end of said rotary members, said auger and helices being arranged to feed grain to said grain conveying means.

16. An attachment according to claim 1, wherein the floor member extends from the crop receiving means to the first feeder means and comprises a ramp portion adjacent the crop receiving means operable in use to guide cut crop from the crop receiving means to the top of the rotary member immediately adjacent the crop receiving means, a curved portion adjacent the ramp portion and contoured so as to follow, and be located close to, the path circumscribed in use by the crop conveying means on said rotary member, and a substantially planar portion extending beneath the rotary members.

17. An attachment according to claim 16, wherein the plane through the axes of the rotary members is inclined upwardly from the crop receiving means and the substantially planar portion of the floor member is similarly inclined.

18. An attachment according to claim 17, wherein the first feeder means is an auger.

19. An attachment according to claim 18, wherein the axes of the rotary members and the axis of the first feeder means lie substantially in a common plane.

20. An attachment according to claim 19, wherein the effective diameter of the rotary member immediately adjacent the crop receiving means is smaller than that of the remaining rotary members.

21. An attachment according to claim 20, wherein the effective diameter of the remaining rotary members progressively increases from the rotary member immediately adjacent the crop receiving means.

22. An attachment according to claim 21, wherein the crop receiving means are in the form of a cutterbar.

23. An attachment according to claim 21, wherein the crop receiving means are in the form of crop pick-up means for gathering previously severed crop from the ground.

24. In a crop harvesting machine having a frame; crop harvesting means supported by said frame to harvest crop material fed thereto; a first feeding means mounted adjacent said crop harvesting means to feed crop material thereto; and a cutterbar mounted on said frame forwardly of said first feeding means to sever standing crop material, the improvement comprising:
second feeding means mounted on said frame between said cutterbar and said first feeding means to convey severed crop material from said cutterbar to said first feeding means, said second feeding means including a plurality of transverse rotary members rotatably mounted in longitudinal alignment, each said rotary member having crop conveying means affixed thereto and rotatable therewith to convey severed crop material rearwardly, said rotary members being longitudinally spaced and rotated in the same direction such that adjacent said crop conveying means interleave and effectually form a moving floor that is operable to convey severed crop material from said cutterbar to said first feeding means; the rotary member disposed immediately adjacent the crop receiving means being operable as an auger in cooperation with a trough formed in a floor member extending beneath the rotary members, said floor member being inclined downwardly towards the trough whereby grain and other material separated from crop material as it is acted upon, in use, by the second feeder means falls to the floor member and gravitates to the trough.

25. The crop harvesting machine of claim 31 wherein each said crop conveying means comprises a flange affixed to the respective said rotary member.

26. The crop harvesting machine of claim 25 wherein each said flange is mounted on the respective said rotary member in the shape of a helix.

27. The crop harvesting machine of claim 25 or 26 wherein each said flange has a square-like configuration.

28. The crop harvesting machine of claim 24 wherein each said rotary member includes a pair of paddles mounted thereon in opposing relationship to each other and extending radially from the respective rotary member, the paddles on one of said rotary members being mounted at generally right angles to the paddles on the adjacent said rotary member.

29. The crop harvesting machine of claim 28 further comprising drive means for rotatably driving said rotary members in a timed relationship.

30. The crop harvesting machine of claim 29 wherein the rotary member adjacent said cutterbar is cooperable with said floor to convey any loose crop material lost through said crop conveying means and falling onto said floor to said paddles mounted thereon, said paddles on said rotary members being operable to convey said loose crop material rearwardly from one rotary member to another to said first feeding means.

31. The crop harvesting machine of claim 30 wherein each said paddle includes a rigid portion affixed to the respective said rotary member and a flexible portion affixed to said rigid portion.

32. The crop harvesting machine of claim 31 further comprising pick-up means for gathering previously severed crop material from the ground and conveying it directly to said second feeding means, bypassing said cutterbar.

* * * * *